United States Patent

[11] 3,586,417

[72] Inventor Louis G. Fields
 Los Angeles, Calif.
[21] Appl. No. 754,339
[22] Filed Aug. 21, 1968
[45] Patented June 22, 1971
[73] Assignee Calbiochem
 Los Angeles, Calif.

[54] VARIABLE COLOR FILTER
 18 Claims, 6 Drawing Figs.

[52] U.S. Cl. .................................................. 350/160,
 350/312
[51] Int. Cl. .................................................. G02f 1/28,
 G02g 5/24
[50] Field of Search .......................................... 350/160,
 312, 321; 219/311, 330

[56] References Cited
 UNITED STATES PATENTS
 3,458,249 7/1969 George .......................... 350/312 X
 2,897,333 7/1959 McFarlane et al. ............ 219/311 X
 OTHER REFERENCES
 McAlister, "The Christiansen Light Filter: Its Advantages And Limitations," SMITHSONIAN MISC. COLLECTORS. Vol 93 No. 7, April 2, 1935

Barnes, "The Christiansen Filter Effect In the Infrared"; PHYSICAL REVIEW, Vol. 49, May 15, 1936.

Primary Examiner—Ronald L. Wibert
Assistant Examiner—J. Rothenberg
Attorneys—John H. Tregoning and Marvin Jabin ABSTRACT: This invention is directed to a variable color filter, which color filter includes a sealed housing containing at least one window for the passage of light energy. A plurality of small particles formed of a first material such as quartz are mixed with a fluid medium formed of a second material, and the mixture is contained within the sealed housing. The first material has a dispersion curve of a first characteristic and the second material has a dispersion curve of a second characteristic and with the dispersion curve of a second characteristic and with the dispersion curves of the two materials having a point of intersection at a particular wavelength. Light energy entering the housing has a maximum of transmission at the wavelength corresponding to this point of intersection. The maximum of transmission at the particular wavelength results from the Christiansen filter effect. The present invention additionally includes an element located within the sealed housing so as to produce a change in the temperature of the mixture with a corresponding change in the pressure of the mixture and with these changes producing changes in the point of intersection of the two dispersion curves thereby changing the wavelength for the maximum transmission of the light energy.

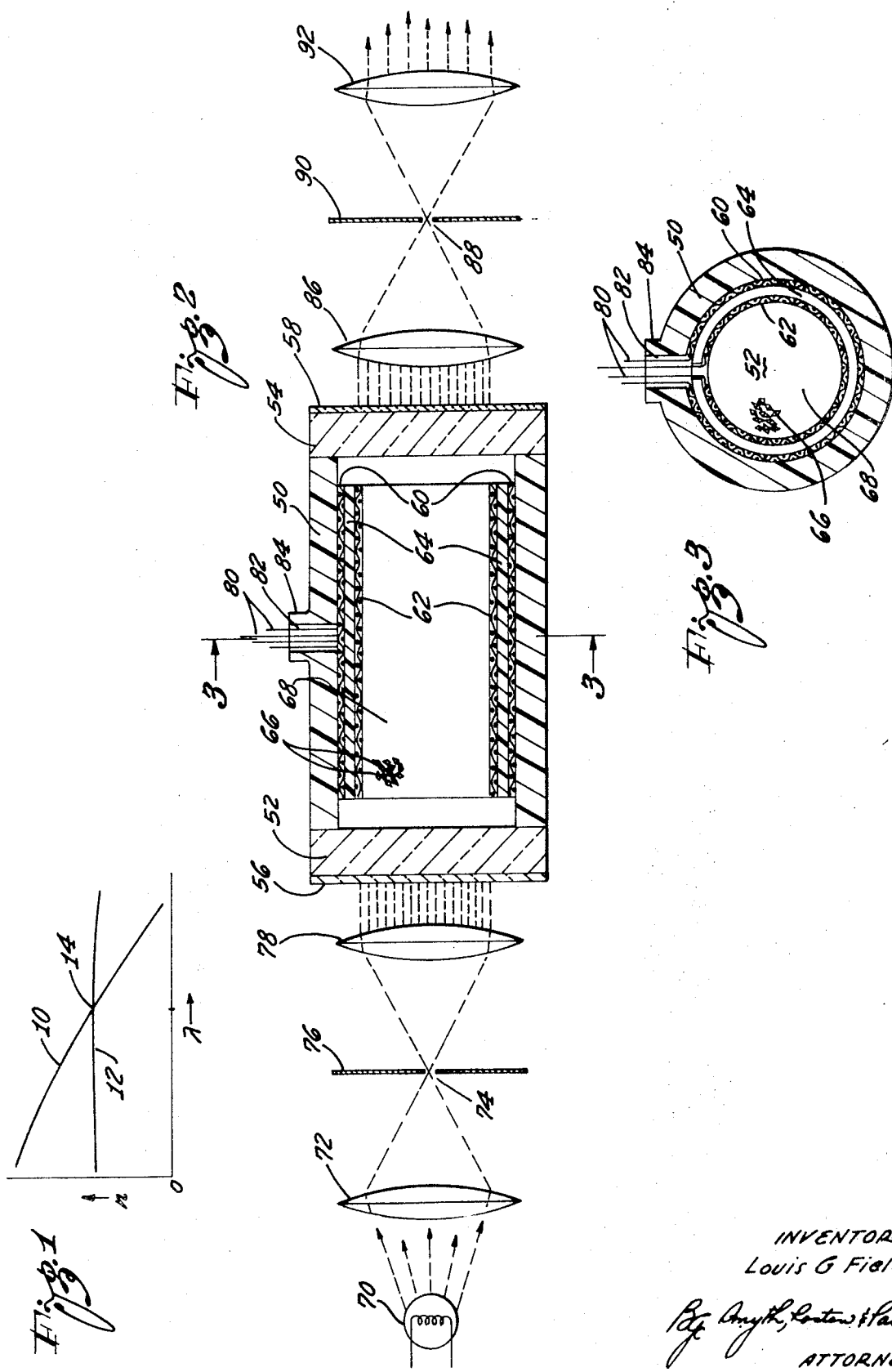

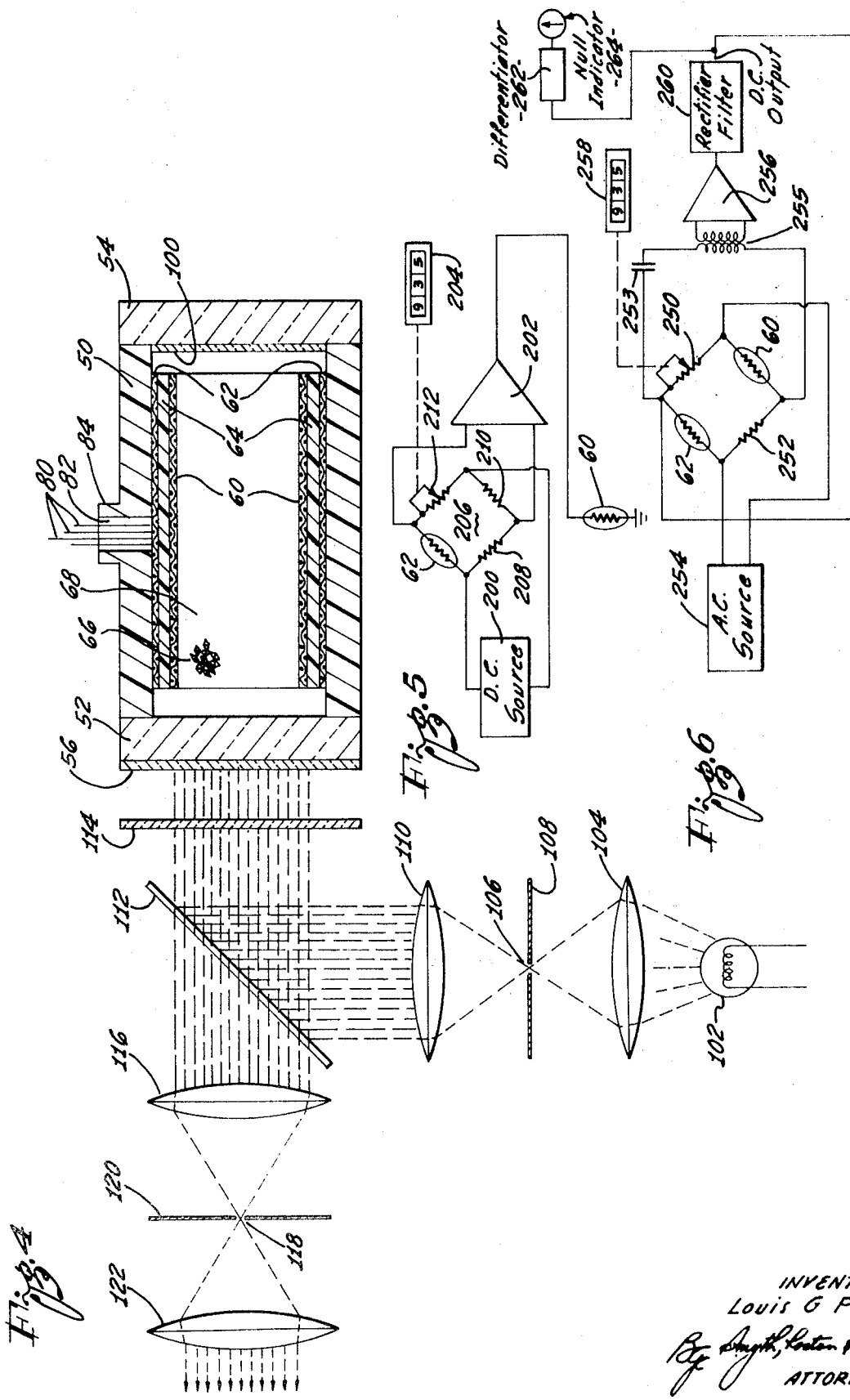

VARIABLE COLOR FILTER

It is often very desirable to have a color filter which passes a narrow band of light energy. This type of filter may be used to produce a narrow band of light from a broadband source of light so as to provide for an essentially monochromatic light source. In addition, a narrow band-pass light filter may be used to analyze the characteristics of an unknown source of light. A color filter of the above type would have its greatest utility if the wavelength of maximum light transmission were variable. It would, therefore, be extremely desirable to have a variable color filter which would pass a very narrow band-pass of light.

A known phenomena which may be used to produce a narrow band-pass of light is the Christiansen filter effect which was reported by Christiansen in 1884. Specifically, the Christiansen filter effect results from the mixture of materials having dissimilar intersecting dispersion curves. The mixture possesses a maximum of parallel transmission at the wavelength corresponding to the point of intersection of the two dispersion curves.

The reason for the maximum of transmission is that only at the wavelength corresponding to the point of intersection of the dispersion curves is the mixture optically homogeneous. Light energy at the wavelength corresponding to the intersection of the dispersion curves passes through the mixture unaffected, while light energy of all other wavelengths suffers refractions at every interface between the two materials and this other refracted light energy is, therefore, scattered strongly. When the light energy lies in the visible region of the spectrum, the transmitted light has a color corresponding to the wavelength representing the point of intersection of the two dispersion curves. When the light energy is in the infrared of ultraviolet regions of the spectrum, the wavelength of the transmitted light corresponds to the wavelength at the point of intersection of the two dispersion curves.

In a particular example of a filter using the Christiansen filter effect, a powder of a crystalline material, such as quartz, is packed together and the interspaces are filled with a suitable transparent fluid medium such as a transparent liquid. Each of the two materials has a different dispersion curve. The dispersion curve is the curve of refractive index versus wavelength of the light energy. The point of intersection between the dispersion curves determines the point of maximum transmission.

It is known that both changes in temperature and pressure affect the point of intersection of the dispersion curves of the two materials. Specifically, an increase in temperature decreases the density of the materials, which decrease in density changes the dispersion curves. On the other hand, an increase in pressure increases the density and this change in density also affects the dispersion curves of the materials. It is relatively difficult to control the point of intersection of a color filter using the Christiansen filter effect by controlling the pressure directly. Pressure changes are difficult to measure and control, and the accuracy of the operation of the filter would be accordingly decreased. Temperature is relatively easy to measure and control, but merely using temperature alone may provide too great a change, thereby preventing finely controllable changes in the frequency of transmission.

The present invention is directed to a variable color filter using the Christiansen filter effect which filter has stable reproducible variations and which variations may be finely controlled. The variable color filter of the present invention has the capability of providing a low insertion loss and a very narrow band-pass or bandstop. The variable color filter specifically includes a mixture of powdered crystalline material such as quartz which is packed closely together and with the interspaces filled with a suitable transparent medium. This mixture is contained within a sealed housing having a rigid structure. The use of a rigid housing prevents external atmospheric changes from affecting the pressure within the housing. Also, the housing is sealed so there is no long term evaporation or contamination of the mixture within the housing.

The sealed housing also includes an element which is used to change the temperature of the mixture. The element may provide for an increase and/or decrease in the temperature in accordance with the construction of the element. As the temperature is changed, the mixture undergoes two effects relating to the density of the mixture. First, an increase in temperature tends to decrease the density of the mixture. Also, the increase in temperature increases the pressure within the housing which has the countereffect of increasing the density of the mixture. The two effects relating to the density of the mixture do not completely offset each other, but the two effects do give a finely controllable, reproducible variation in the point of intersection of the two dispersion curves of the materials in the mixture.

As a further aspect of the invention, a pair of temperature changing elements may be used within the sealed housing, which elements are insulated from each other and which elements substantially surround the mixture. The mixture, sealed housing and the elements essentially form an isotherm and the temperature of the mixture is, therefore, uniform, controlled and independent of external temperature conditions. Specifically, the element may also be temperature sensitive and may be used in a control circuit so as to control the temperature effects produced by the elements. In addition, the control circuitry may be arranged so that one element is a temperature changing element while the other element is a temperature-sensitive element.

In order to produce a fast response for the variable color filter of the present invention, the elements may be resistance elements and may be constructed of a wire mesh material which may be woven or knitted, or the resistance elements may be constructed of a perforated material. The use of a mesh or perforated material increases the surface area of the resistance elements and insures a more rapid and uniform contact between the resistance elements and the mixture. Either one or both of the resistance elements serve as resistance heaters and temperature changes of the variable color filter are produced by changing the flow of current through the resistance elements. The flow of current through the resistance element may either be provided by a direct connection or by induction.

The resistance elements may be in heat-exchanging relationship with each other so that the resistance elements may be part of a closed-loop control system using the heat exchange between the resistance elements as part of the loop. For example, the resistance elements may be arranged concentrically within the sealed housing so as to substantially surround the mixture of materials and with at least a first one of the resistance elements being temperature sensitive so as to produce a change in the resistance of the first resistance elements in accordance with the temperature of the mixture. This change in resistance may be fed back as a change in current flow to the second resistance element, thereby producing a corresponding change in temperature of the second resistance element. This change in temperature is induced back into the first resistance element thereby changing the resistance of the first resistance element and controlling the current flow in the second resistance element accordingly. The resistance elements may also be part of a bridge circuit which produces heating of the mixture by the passage of current through the resistance element and including a control of the current through the resistance elements in accordance with changes of temperature of the mixture.

Other aspects of the invention include the use of a single window in the sealed housing for the passage of light energy and with the light energy which is filtered being reflected back to the single window from a mirrored surface within the sealed housing. The invention also includes the use of two windows so that light energy can pass through the mixture and be filtered in accordance with the point of intersection of the dispersion curves of the materials constituting the mixture. The invention also includes the use of half-mirrored surfaces for the windows so as to reflect unwanted light and pass only parallel rays of light energy. Also, the internal surfaces of the sealed housing may be provided with a light absorbing coating, such as a black surface, so as to absorb scattered light.

A clearer understanding of the invention will be had with reference to the following description and drawings, wherein:

FIG. 1 is a set of curves illustrating the Christiansen filter effect;

FIG. 2 illustrates a first embodiment of a variable color filter constructed in accordance with the teachings of the present invention;

FIG. 3 is a side view of the variable color filter of FIG. 2 taken along lines 3–3 of FIG. 2;

FIG. 4 illustrates a second embodiment of a variable color filter constructed in accordance with the teachings of the present invention;

FIG. 5 is a first embodiment of a control circuit which may be used with the embodiments of FIGS. 2 and 4; and FIG. 6 is a second embodiment of a control circuit which may be used with the variable color filters of FIGS. 2 and 4.

In FIG. 1, the dispersion curves for two materials are shown. Specifically, the dispersion curve for a material is a curve of the refractive index $n$ of the material versus the wavelength $\lambda$ of the energy directed to the material. Specifically, in FIG. 1, a dispersion curve 10 representing a first material shows the material to have a rapidly decreasing refractive index for increases in wavelength. The dispersion curve 12 representing a second material shows the material to have a slightly decreasing refractive index for increases in wavelength. The dispersion curve 10 may represent that of a transparent fluid medium, while the dispersion curve 12 may represent that of a plurality of small particles of a crystalline material such as quartz.

As can be seen in FIG. 1, the dispersion curves intersect at a point 14, which point represents the wavelength which has the maximum of transmission of light energy passing through a mixture of the materials represented by the dispersion curves 10 and 12. The transmission of the light energy at a particular wavelength represented by the point 14 is at a maximum since only at this particular wavelength is the mixture optically homogeneous. Light of the wavelength represented by the point 14 passes through the mixture unaffected, while light of all other wavelengths suffers refraction at every interface between the two materials, and this light of other wavelengths is scattered strongly because of the refraction. The present invention is directed to a color filter which uses the Christiansen filter effect as demonstrated by FIG. 1, but which provides for output light energy of varying wavelengths in accordance with a variation of the point of intersection of the dispersion curves represented by the point 14.

In particular, the invention includes a sealed rigid housing containing the mixture of materials and with an element disposed within the sealed housing so as to change the temperature and, therefore, change the pressure of the mixture within the sealed housing. This double change of temperature and pressure affects the density of the mixture, thereby changing the dispersion curves of the materials in the mixture and changing the point of intersection for the dispersion curves.

In FIG. 2, a first embodiment of a variable color filter constructed in accordance with the teachings of the present invention is shown. FIG. 3 illustrates a cross-sectional view of the embodiment of FIG. 2 taken along lines 3–3 in FIG. 2.

The first embodiment of the variable color filter includes an outer tubular housing 50. The outer tubular housing 50 is constructed of a rigid material which is not affected by external atmospheric conditions or by changes in pressure within the housing. For example, the tubular housing member 50 may be constructed of an insulating material such as quartz but it is to be appreciated that with the use of proper insulation the housing member may also be constructed of a conductive material such as platinum. Sealed across both ends of the tubular housing 50 are a pair of end members 52 and 54. These end members are carefully ground to be flat and parallel so as to pass light energy directed through the end members perpendicular to the end members without producing any refraction of the light energy.

In addition, the end members 52 and 54 may have their outer surfaces half mirrored as shown by coatings 56 and 58. The use of a half-mirrored surface operates to reflect unwanted light and tends to pass only light energy which is perpendicular to the surfaces 56 and 58. It is to be appreciated that the half-mirrored surfaces 56 and 58 may also be located internally. The combination of the tubular member 50 plus the end members 52 and 54 which are sealed to the tubular member 50 at each end provides for a very rigid sealed housing member.

Also located within the sealed housing are a pair of resistance elements 60 and 62 which resistance elements are separated by an insulating member 64. At least one of the resistance elements 60 and 62 forms an electrical resistance heater and in order to provide for the greatest surface area the resistance elements may be constructed of a wire mesh which is woven or knitted. As an alternative, the resistance elements may be constructed of a sheet material which has been perforated so as to increase the surface area. Specifically, the resistance elements may be constructed of a material such as stainless steel or platinum. Finally, the interior of the sealed housing is filled with a mixture including a plurality of particles 66 such as quartz and with the spaces between the particles filled with a fluid medium 68. It is to be appreciated that the resistance elements and the interior surface of the housing 50 may all be coated with a light-absorbing surface so as to absorb scattered light energy.

The resistance elements 60 and 62 substantially surround the mixture composed of the materials 66 and 68 and the mixture is independent of external temperature conditions. The rigidity of the housing isolates the mixture from external atmospheric conditions so that the temperature and pressure of the mixture is very accurately controlled by the resistance elements 60 and 62. The resistance elements 60 and 62 are located close enough so as to be in heat-exchanging relationship, and the resistance elements may be included in a combination heating and control circuit so as to maintain the temperature at a desired constant value. The particular circuitry will be explained later.

The variable color filter of FIGS. 2 and 3 may be used in a complete optical system as shown in FIG. 2. The optical system may include a source of light energy 70 which provides a broad spectrum of output light energy. This broad spectrum of light energy may include infrared and ultraviolet energy in addition to the visible light energy. The light energy from the light source 70 is focused by a lens 72 through a small opening 74 in a plate 76. The light passing through the small opening 74 impinges on a collimating lens 78 so as to produce parallel rays of light energy which are directed to the surface 56 of the variable color filter of the present invention. The combination of the lenses 72 and 78 and the opening 74 forms a beam collimator.

As the light energy passes through the half-mirrored surface 56, the light energy which is not perpendicular to the surface 56 tends to be reflected and, therefore, does not enter into the interior of the variable color filter. The light energy entering the interior of the variable color filter then passes through the mixture including the particles 66 and the transparent medium 68 and the maximum of transmission of the light energy corresponds to the point of intersection of the dispersion curves for the particles 66 and transparent medium 68. If it is desired to change this point of intersection, the resistance element 60 and 62 are used to change the temperature and the pressure of the mixture.

The resistance elements 60 and 62 are energized through a plurality of leads 80 which pass into the interior of the sealed housing through a plug member 82. The leads 80 are sealed within the plug member 82 and the plug member 82 is sealed within a flange 84 extending from the tubular member 50. It is to be appreciated that there may be other ways of passing the lead members into the interior of the sealed housing. It is also to be appreciated that the heating elements 60 and 62 may be tubular and not split as shown in FIG. 3 and that electrical energy may be passed to and from the heating elements from the ends of the heating elements.

As can be seen in FIGS. 2 and 3, the resistance elements 60 and 62 are adjacent to each other and may be in heat-exchanging relationship. The resistance elements 60 and 62 may also be temperature sensitive in that changes in temperature of the resistance elements would be reflected as changes in the resistance of the resistance elements. The resistance element 60 is adjacent to the housing 50 and, therefore, is more responsive to the changes in temperature of the housing 50. The housing 50, of course, is responsive to external temperature conditions. The resistance element 62, on the other hand, is more responsive to changes in temperature of the mixture of materials 66 and 68. The resistance elements, therefore, may be incorporated in a control circuit so as to control the energy provided to the heating elements. Two embodiments of control circuits which may be used for the variable color filters of the present invention will be described later.

The light energy which passes from the variable color filter is strongly of a single wavelength due to the Christiansen filter effect. This light energy also passes through the half-mirrored surface 58 which tends to reflect unwanted light which unwanted light is not perpendicular to the surface 58 and pass wanted light which wanted light is parallel to the housing 50. It is to be appreciated that the parallel light is the light which passes through the variable color filter at the wavelength corresponding to the point of intersection of the dispersion curves. Also, light energy within the color filter which strikes the surfaces 56 and 58 at an angle other than 90° is scattered and absorbed.

The light coming from the variable color filter is then directed to a lens 86 which lens focuses the light through an opening 88 contained in a plate 90. The light passing through the opening 88 is then collimated by a lens 92. It is to be appreciated that light which is not parallel would not pass through the opening 88 and the use of the combination of the lenses 86 and 92 and the opening 88 tends to sharpen the output from the variable color filter of the present invention. The structure including the lenses 86 and 92 and the opening 88, although serving as a collimator, also acts as a band-pass filter. It is to be appreciated that the opening 88 may be variable so as to adjust the bandwidth of the light energy. Also, the opening 88 may be replaced with a stop 58 so as to provide for a band stop filter.

The second embodiment of the invention shown in FIG. 4 has certain similarities to the embodiment of FIG. 2 and similar elements will be given similar reference characters. In the embodiment of FIG. 4, the outer housing 50 includes end members 52 and 54. The end member 52 has a half-silvered surface 56. Contained within the housing are the small particles of material 66 which may be quartz and the material 66 is mixed with the transparent fluid medium 68. The pair of resistance elements 60 and 62 which may be wire mesh or perforated metal are insulated by the insulator 64. Energy to and from the resistance elements is passed through the plug member 82 which plug member is sealed at the flange 84. The energy is passed by the plurality of lead members 80.

The above structure is essentially similar to that shown in FIG. 2. However, in FIG. 4, the end member 54 includes a full-mirrored surface 100. It is to be appreciated that this full-mirrored surface may be either in the position shown or may be external. Light energy, therefore, which passes through the half-mirrored surface 56 and into the interior of the housing is reflected from the full-mirrored surface 100. It can be seen, therefore, that light energy which is perpendicular to the surface of the mirrored surface 100 is reflected back toward the end member 52 and through the half-mirrored surface 56. The use of the full-mirrored surface 100 essentially doubles the path of the light energy through the variable color filter without increasing the length of the color filter. The increased length of the color filter sharpens the point of maximum transmission of the light energy.

An optical system for use with the embodiment of FIG. 4 is shown and includes a light source 102 which directs light energy toward a lens 104. The lens 104 focuses the light energy through an opening 106 in a plate 108. The output light energy from the opening 106 impinges on a lens 110 to produce a collimated beam of light energy. This collimated beam of light energy is directed toward a half-mirrored surface 112. A portion of the light energy is reflected toward a circular polarizer 114. The collimated light energy is, therefore, circularly polarized before passing to the half-mirrored surface 56. As described with reference to FIG. 2, light energy which is not perpendicular tends to be reflected from the half-mirrored surface 56 and does not pass into the variable color filter. In order to prevent the light energy reflected from the half-mirrored surface 56 from entering into the output signal, the circular polarizer 114 is positioned so that the light energy reflected directly from the half-mirrored surface 56 is out of phase and will not pass through the circular polarizer 114.

The light energy which enters the color filter is filtered due to the Chrstiansen filter effect. As indicated above, this effect is doubled because the light energy is reflected from the full-mirrored surface 100. The light energy at the single frequency representing the point of intersection of the dispersion curves is, therefore, reflected from this mirrored surface 100 and is passed back through the circular polarizer and through the half-mirrored surface 112 to impinge on a lens 116. The lens 116 focuses the light energy through an opening 118 in a plate 120. Light energy other than the parallel rays of light energy at the desired frequency will not be focused through the opening 118 and this eliminates unwanted light energy. The desired light energy is then focused into a collimated beam by a lens 122.

The frequency of maximum transmission may be varied through an increase or decrease of energy supplied to the resistance elements 60 and 62. The change in the temperature of the mixture 66 and 68 not only produces changes in the density due to temperature, but also produces changes in the density due to changes in pressure caused by the change in temperature. These two changes are opposite but do not completely offset each other and, therefore, the output change in wavelength of light energy is finely controllable and is easily reproducible. It is to be appreciated that the outer housing of the variable color filter need not be rigid. If the outer housing is not rigid, the frequency of maximum transmission would then be directly in response to changes in temperature.

FIGS. 5 and 6 illustrate a pair of control circuits which may be used with the embodiments of FIGS. 2 and 4. In FIG. 5, the elements 60 and 62 are shown as resistance elements and it is to be appreciated that the resistance elements may also be temperature sensitive in that the resistances 60 and 62 may vary in accordance with the temperature of the heating elements. A DC source of energy 200 supplies current to the electrical heating element 62 which heating element 62 is included in a bridge circuit 206 including heating element 62, resistors 208 and 210 and variable resistor 212. In addition, a DC amplifier 202 produces an output current in accordance with the voltage input and the input is controlled by the resistance value of the resistance element 62 once the variable resistor 212 has been set. The output from the DC amplifier 202 in turn is coupled through the resistance element 60 which acts as a heater to a reference potential such as ground. The position of the variable resistor 212 may be monitored by a counter 204 so as to provide for an output indication of the frequency of operation of the color filter.

As can be seen with reference to FIGS. 2, 4 and 5, once the variable resistor 212 has been set to the desired frequency, changes in temperature of the mixture 66 and 68 would produce changes in resistance of the resistance element 62, which element operates as a temperature sensor. This in turn would vary the voltage input to the amplifier 202 which would vary the output to the resistance element 60, which element operates as a heater. The amplifier 202 may be adjusted so that a decrease in temperature of the mixture 66 and 68 is reflected by an increase in the supply of energy to the heater 60. An increase in the supply of energy to the heater 60 produces an increase in temperature and since the resistance elements 60 and 62 are in heat-exchanging relationship, an increase in temperature of the resistance element 60 produces an increase in temperature of the resistance element 62. The increase in temperature of the resistance elements 60 and 62 would tend to also increase the temperature of the mixture 66 and 68. It can be seen, therefore, that eventually an equilibrium point would be reached and this equilibrium point would be maintained due to the interaction of the resistance elements 60 and 62. The original setting of the variable resistor 212 determines the equilibrium point since an input to the amplifier is produced until the bridge 206 is in balance. The counter 204 which is responsive to the setting of the variable resistor may be constructed to readout directly in the wavelength or in the frequency of operation. It is to be appreciated that the resistance elements 60 and 62 may be constructed so that one element operates solely as a heater while the other element operates solely as a temperature sensor.

FIG. 6 illustrates a second embodiment of a control circuit using the resistance elements 60 and 62 of FIGS. 2 and 4. In FIG. 6, the elements 60 and 62 are shown as resistance elements and are part of a bridge circuit including a pair of additional resistors 250 and 252 wherein resistor 250 is variable. An AC source 254 supplies AC power across two arms of the bridge. An AC output from the bridge is derived and fed to an amplifier 256 through a capacitor 253 and an isolation transformer 255. The amplifier produces an output signal which is fed through a rectifier and filter 260 to produce a DC control signal which is applied to the bridge to control the heating of the resistance elements 60 and 62. The setting of the variable resistor 250 may be monitored by the digital counter 258. Also, a differentiator 262 and null indicator 264 may be coupled from the DC control line so as to monitor the rate of change of the heating current and indicate when the steady state condition is met.

It can be seen, therefore, as temperature conditions of the mixture 66 and 68 change, these changes produce corresponding changes in temperature of the resistance elements 60 and 62. The change in temperature of the resistance elements 60 and 62 varies in resistance of the resistance elements 60 and 62 which in turn produces a change in the AC output from the bridge. This AC output is coupled through the capacitor 253 and the transformer 255 and is amplified by the amplifier 256. The capacitor 253 eliminates the DC and the transformer isolates the amplifier. The rectifier and filter 260 converts the AC signal to a DC control signal which is coupled back to the bridge to control the heating produced by the resistance elements 60 and 62. The setting of the variable resistor 250 controls the frequency of operation since the AC error signal is in accordance with the unbalance of the bridge and the setting of the variable resistor initially unbalances the bridge. The DC control signal tends to change the resistance of the resistance elements 60 and 62 so as to rebalance the bridge. The digital counter 258 may be set so as to directly monitor the wavelength or frequency of operation of the color filter. However, as long as the DC control signal is changing, the color filter has not stabilized. Therefore, the differentiator 262 and null indicator 264 provide an indication when the color filter has stabilized.

The present invention has been described with reference to a variable color filter including a sealed rigid housing containing a mixture of two materials having dispersion curves which intersect at a particular wavelength. The point of intersection may be varied using an element contained within the sealed housing to control the temperature of the mixture. The control of the temperature also controls the pressure since the housing is rigid and the combination of effects produces a finely controllable variation in output frequency for the color filter.

In addition, the present invention includes a pair of resistance elements, one of which at least is temperature sensitive, which resistance elements are used in a control loop so as to maintain the temperature of the mixture at a point of equilibrium. The variable color filter of the present invention is essentially independent from outside temperature and atmospheric conditions and is finely controllable over a range of output frequencies and has this range of output frequencies reproducible to an accurate degree and exhibits long term absolute stabilization. Although the present invention has been described with reference to particular embodiments, it is to be appreciated that various adaptations and modifications may be made. For example, the temperature changing element may be constructed in a known manner as a thermoelectric device so as to produce cooling of the mixture or both heating and cooling of the mixture. The invention is, therefore, only to be limited by the appended claims.

What I claim is:
1. A variable color filter, including
    a sealed housing, including at least one window at one end of the sealed housing for passing light energy and wherein the other end of the sealed housing forms a mirrored surface to reflect the light energy back towards said window,
    a plurality of particles formed of a first material mixed throughout a fluid medium formed of a second material and with the plurality of particles mixed throughout the fluid medium contained within the sealed housing,
    the first material having a dispersion curve of a first characteristic and the second material having a dispersion curve of a second characteristic and with the mixture of the particles and the fluid medium having a maximum of transmission of light energy at the wavelength corresponding to the point of intersection of the two dispersion curves, and
    an element located within the sealed housing to produce a change in the temperature of the mixture of the particles and the fluid medium and to vary the point of intersection of the two dispersion curves.
2. The variable color filter of claim 1 additionally including another window for passing light energy and with the other window located opposite to the one window.
3. The variable color filter of claim 1 wherein the temperature changing element at least partially surrounds the mixture of small particles and the fluid medium so that the mixture is independent of temperature conditions outside the sealed housing.
4. A variable color filter, including
    a tubular housing having both ends sealed and with at least one end including a window for the passage of light energy,
    a mixture of two materials contained within the tubular housing and with each material having a different dispersion curve and with the dispersion curves intersection at a particular wavelength in accordance with the temperature of the mixture, and
    an element generally having a tubular configuration contained within the tubular housing and surrounding the mixture and with the element producing a control of the temperature of the mixture of the two materials and producing an independence of the mixture from temperature conditions external to the sealed housing.
5. The variable color filter of claim 4 wherein the temperature changing element is an electrical heater and is constructed of a wire network so as to increase the surface area.
6. The variable color filter of claim 4 wherein the temperature changing element is an electrical heater and is constructed of perforated material so as to increase the surface area.
7. The variable color filter of claim 4 wherein both ends of the tubular housing include a window for the passage of light energy.
8. A variable color filter, including
    a sealed rigid housing including at least one area for the passage of light energy, a crystalline powder mixed in a transparent liquid medium and with the mixture contained in the sealed housing, the crystalline powder and the transparent liquid medium each having different dispersion curves and with the dispersion curves intersecting at a particular wavelength of light energy in accordance with the temperature, and an element thermally coupled to the mixture and contained in the sealed housing for producing changes in the temperature of the mixture contained in the sealed housing and for producing variations in the point of intersection of the dispersion curves with variations in the temperature, sufficient to produce a change in the color of the light which is passed by the the filter.

9. The variable filter of claim 8 wherein the crystalline powder is quartz.

10. The variable color filter of claim 8 wherein the crystalline powder is closely spaced within the sealed housing and the transparent liquid medium fills the interspaces.

11 A variable color filter, including a sealed rigid housing including at least one area for the passage of light energy, a mixture of two materials contained within the sealed housing and with each material having a different dispersion curve and with the dispersion curves intersecting at a particular wavelength in accordance with the temperature of the mixture, at least a pair of temperature-sensitive heating elements located within the sealed housing to control the temperature of the mixture to control the intersection of the dispersion curves and with the pair of temperature-sensitive heating elements responsive to changes in the temperature of the sealed housing and of the mixture, and means coupled to the pair of temperature-sensitive heating elements to control the heating output from the heating elements in accordance with the temperature of the sealed housing and the mixture to maintain a desired constant temperature for the mixture.

12. The variable color filter of claim 11 wherein the pair of temperature-sensitive heating elements are disposed adjacent to each other in heat-exchanging relationship.

13. The variable color filter of claim 11 wherein the pair of temperature-sensitive heating elements and the last-mentioned means form a bridge circuit in association with a controlled source of energy.

14. The variable color filter of claim 11 wherein one of the temperature-sensitive heating elements controls a source of energy which supplies the other of the temperature-sensitive heating elements and wherein the pair of heating elements are in heat-exchanging relationship.

15. A variable color filter, including a sealed housing having both ends sealed and with at least one end of the housing including a half-mirrored window for the passage of light energy, a mixture of two materials contained within the tubular housing and with each material having a different dispersion curve and with the dispersion curves intersecting at a particular wavelength in accordance with the temperature of the mixture, and an element contained within the housing and surrounding the mixture and with the element producing a control of the temperature of the mixture of the two materials and producing an independence of the mixture from temperature conditions external to the sealed housing.

16. The variable color filter of claim 15 additionally including another half-mirrored window for passing light energy and with the other window located opposite to the window in the one end.

17. The variable color filter of claim 15 wherein the other end of the housing includes a full mirror for reflecting light energy back toward the one window.

18. The variable color filter of claim 17 additionally including a circular polarizer located adjacent to the half-mirrored window to minimize reflections from the half-mirrored window.